Dec. 21, 1943.    S. H. BROOKS    2,337,520
BRACKET
Filed Nov. 7, 1942
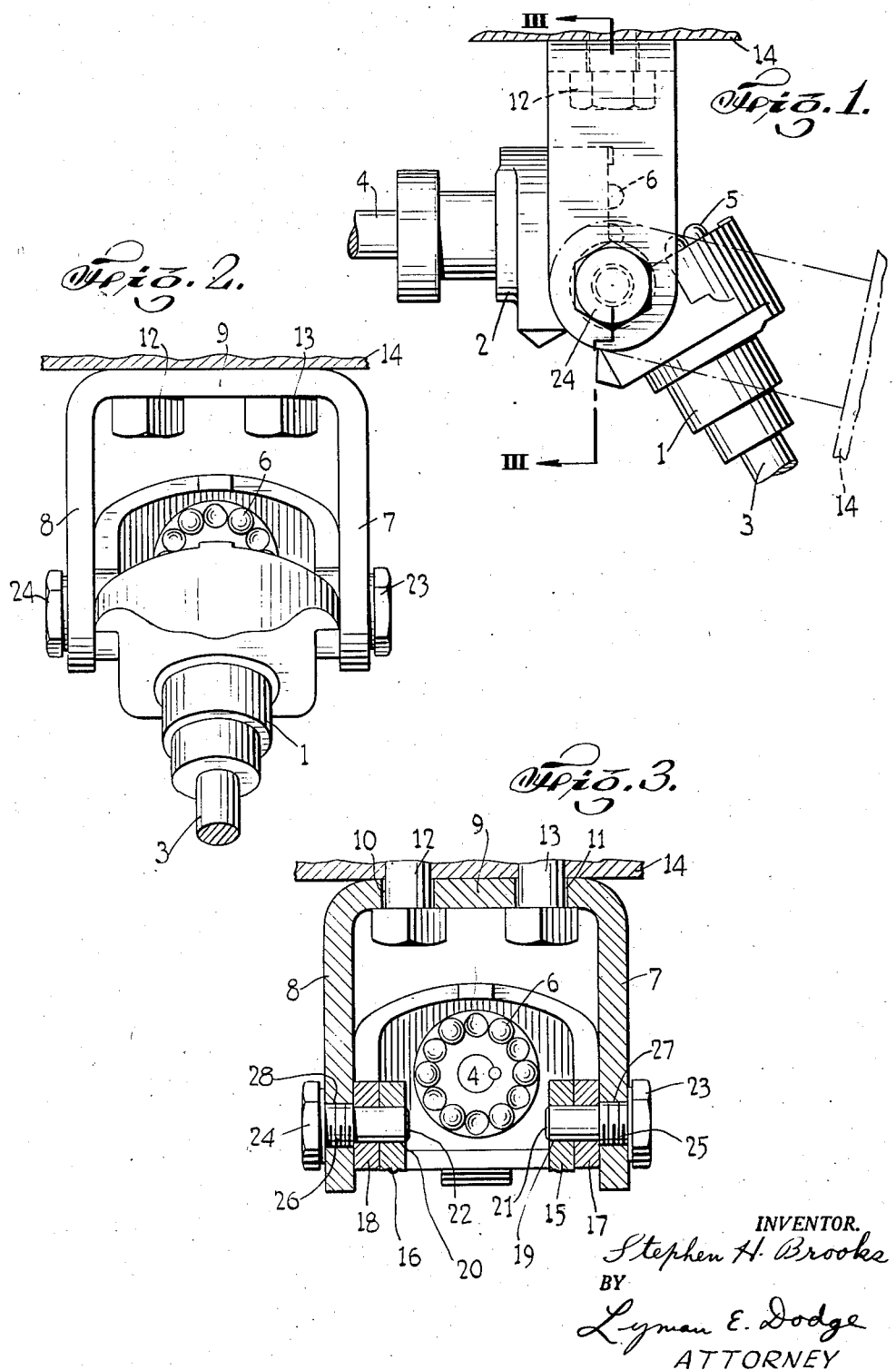
INVENTOR.
Stephen H. Brooks
BY
Lyman E. Dodge
ATTORNEY Patented Dec. 21, 1943

2,337,520

UNITED STATES PATENT OFFICE 2,337,520

BRACKET

Stephen H. Brooks, New York, N. Y., assignor to Brooks Equipment Corporation, New York, N. Y., a corporation of New York Application November 7, 1942, Serial No. 465,148

3 Claims. (Cl. 308—15)

This invention relates to machine elements, particularly coupling elements, more especially flexible shaft couplings, and specifically to a bracket therefor.

A principal object of this invention is the production of a device of the type specified which is so constructed that it is adapted to provide a support for a flexible or hinged coupling of a nature such that the coupling together with the drive and driven shafts attached thereto may pivot bodily on a trunnion.

Further objects and advantages will appear as the description of the particular physical embodiment selected to illustrate the invention progresses and the novel features will be particularly pointed out in the appended claims.

In discussing the invention in detail, and the particular physical embodiment selected to illustrate the invention, reference will be had to the accompanying drawing, and the several views thereon wherein like characters of reference designate corresponding parts throughout the several views, in which:

Fig. 1 is a side elevational view of a hinged coupling supported by a device of my invention; Fig. 2 is a front elevational view of the device as shown by Fig. 1; Fig. 3 is a cross sectional view of the device as shown by Fig. 1 on the plane indicated by the line III—III, of Fig. 1, viewed in the direction of the arrows at the ends of the line.

In the figures, numeral 1 designates one housing of a hinged joint and 2 designates another housing of the same joint. Each housing supports a shaft, as 3 and 4, respectively. Each shaft on the end thereof has a gear, as 5 and 6, which gears intermesh and so transmit motion from one shaft to the other shaft.

The parts heretofore discussed are substantially of the form as shown in my Patent Number 2,281,913, dated May 5, 1942, and no novelty is claimed therefor.

The present invention is direction to a means for supporting the hinged joint in a fixed relation to a fixed object.

In order to suitably support the hinged joint so that the housings 1 and 2 and the shafts carried thereby may not only pivot relatively, as heretofore, but also be supported in a fixed relation to a fixed object, I provide two outstanding arms, 7 and 8, connected by a common member 9. For attaching the common member 9, I prefer to form through orifices, as 10 and 11, therein, through which may be passed bolts, as 12 and 13, which may be embedded or attached to a fixed object shown in a fragmentary manner at 14.

In order that the housings, 1 and 2, may relatively pivot, each is provided with ears. Housing 1 is provided with the ears 15 and 16 and housing 2 with the ears 17 and 18. These ears, 15 to 18 inclusive, are orificed, as at 19 and 20, with the orifices adapted to be placed in line when the housings are in proper operative relation so that a gear 5 properly meshes with a gear 6.

After the housings are put in position as shown in the figures and especially Fig. 3, trunnions 21 and 22 are inserted in the through orifices in the ears so as to form a pivotal support for the housings 1 and 2.

The trunnions 21 and 22 are preferably formed as the ends of cap screws 23 and 24. These cap screws have the usual hexagonal head and for a portion of their length are screw threaded, as at 25 and 26, which screw thread is adapted to cooperate with screw threaded orifices, as 27 and 28, formed in the outstanding arms 7 and 8 respectively.

By the construction above described, it will be seen that the bracket formed by the common member 9 and the outstanding arms 7 and 8 may be bolted to a fixed member, as 14. This fixed member 14 may lie in practically any position as regards the joint, that is, it may be as shown in full lines in Fig. 1 or as shown in dash and dot lines in Fig. 1. The trunnions 21 and 22 take the place of the usual pivot pins which are associated with an unsupported hinged joint.

The construction is such that the joints with their attached shafts may be alined and placed in proper position and then the bracket can be properly positioned in regard to them after which the pivot pins or trunnions may be screwed into place in the arms 7 and 8 and then the bolts 12 and 13 put in place attaching the bracket to a fixed object or the brackets can be first attached to a fixed object and the joints attached thereto.

It will also be seen that in case of repairs it will not be necessary to remove the bracket to disassemble the joint because this can be done merely by removing the trunnions 21 and 22 whereupon the joint may be disassociated from the bracket.

Although I have particularly described one particular physical embodiment of my invention, nevertheless, I desire to have it understood that the form selected is merely illustrative and does not exhaust the possible physical embodiments of the idea of means underlying my invention.

What I claim as new and desire to secure by Letters Patent of the United States, is:

1. The combination of a pair of shafts, a universal joint therebetween, a housing on each shaft, the housings being pivoted together adjacent said joint, a yoke member for attachment to a fixed support, said yoke member pivoted to the housings, said pivotal connections being common.

2. The combination of a pair of shafts, interengaging members, one on each shaft whereby one shaft may drive the other, housings, one surrounding each shaft and its interengaging member, pivots upon which said housings may pivot, a yoke member for attachment to a fixed support, said yoke member pivoted on said pivots.

3. In a support for a hinged joint, of the type having shafts in casings formed with ears adapted to be oscillated about separated in line pivot pins, in combination: two arms, said arms so spaced that the outside surface of each outside ear bears against an arm, each of said arms formed with a through threaded orifice; a member common to said arms including means for attachment to a fixed object and cap screws in the orifices, each cap screw formed with a screw thread adapted to cooperate with the screw thread of the orifice in which it is positioned and each cap screw formed with a terminal trunnion adapted to support and allow oscillation of the ears of a hinged joint.

STEPHEN H. BROOKS.